(12) United States Patent
Tosaka

(10) Patent No.: US 9,164,875 B2
(45) Date of Patent: Oct. 20, 2015

(54) ERROR DETECTION METHOD, INFORMATION PROCESSING CIRCUIT, AND ERROR DETECTION COMPUTER PROGRAM PRODUCT

(71) Applicant: Ryoh Tosaka, Kanagawa (JP)

(72) Inventor: Ryoh Tosaka, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 142 days.

(21) Appl. No.: 13/658,094

(22) Filed: Oct. 23, 2012

(65) Prior Publication Data

US 2013/0111266 A1    May 2, 2013

(30) Foreign Application Priority Data

Oct. 28, 2011    (JP) .................................. 2011-237316

(51) Int. Cl.
*G06F 11/00*    (2006.01)
*G06F 11/36*    (2006.01)
*G06F 11/07*    (2006.01)

(52) U.S. Cl.
CPC ........ *G06F 11/3664* (2013.01); *G06F 11/0733* (2013.01); *G06F 11/0751* (2013.01); *G06F 11/0775* (2013.01); *G06F 11/366* (2013.01)

(58) Field of Classification Search
CPC ............ G06F 11/3648; G06F 11/3466; G06F 11/261; G06F 11/3656; G06F 11/3636; G06F 11/263; G06F 11/3664; G06F 11/366; G06F 11/0733; G06F 11/0751; G06F 11/0775
USPC .................................................. 714/37, 28, 32
See application file for complete search history.

(56) References Cited

U.S. PATENT DOCUMENTS

| | | | | |
|---|---|---|---|---|
| 7,418,618 | B2 * | 8/2008 | Huang .............................. | 714/2 |
| 2005/0102673 | A1 * | 5/2005 | DeWitt et al. ................. | 718/100 |
| 2007/0198997 | A1 * | 8/2007 | Jacops et al. .................. | 719/328 |
| 2010/0174872 | A1 * | 7/2010 | Baxter et al. .................. | 711/147 |

FOREIGN PATENT DOCUMENTS

JP    2008-226207    9/2008

* cited by examiner

*Primary Examiner* — Yair Leibovich
(74) *Attorney, Agent, or Firm* — Oblon, McClelland, Maier & Neustadt, L.L.P.

(57) ABSTRACT

An error detection method is to detect an error in a program to control hardware, which executes predetermined processing, via a register. The error detection method includes: outputting a signal indicating whether the predetermined processing is in execution; detecting that a change is made in a register value in the register, which register value is related to control of the predetermined processing, and outputting a detection signal; and detecting an error when it is detected, based on the signal indicating whether the predetermined processing is in execution and on the detection signal, that the change is made in the register value while the predetermined processing is in execution.

9 Claims, 10 Drawing Sheets

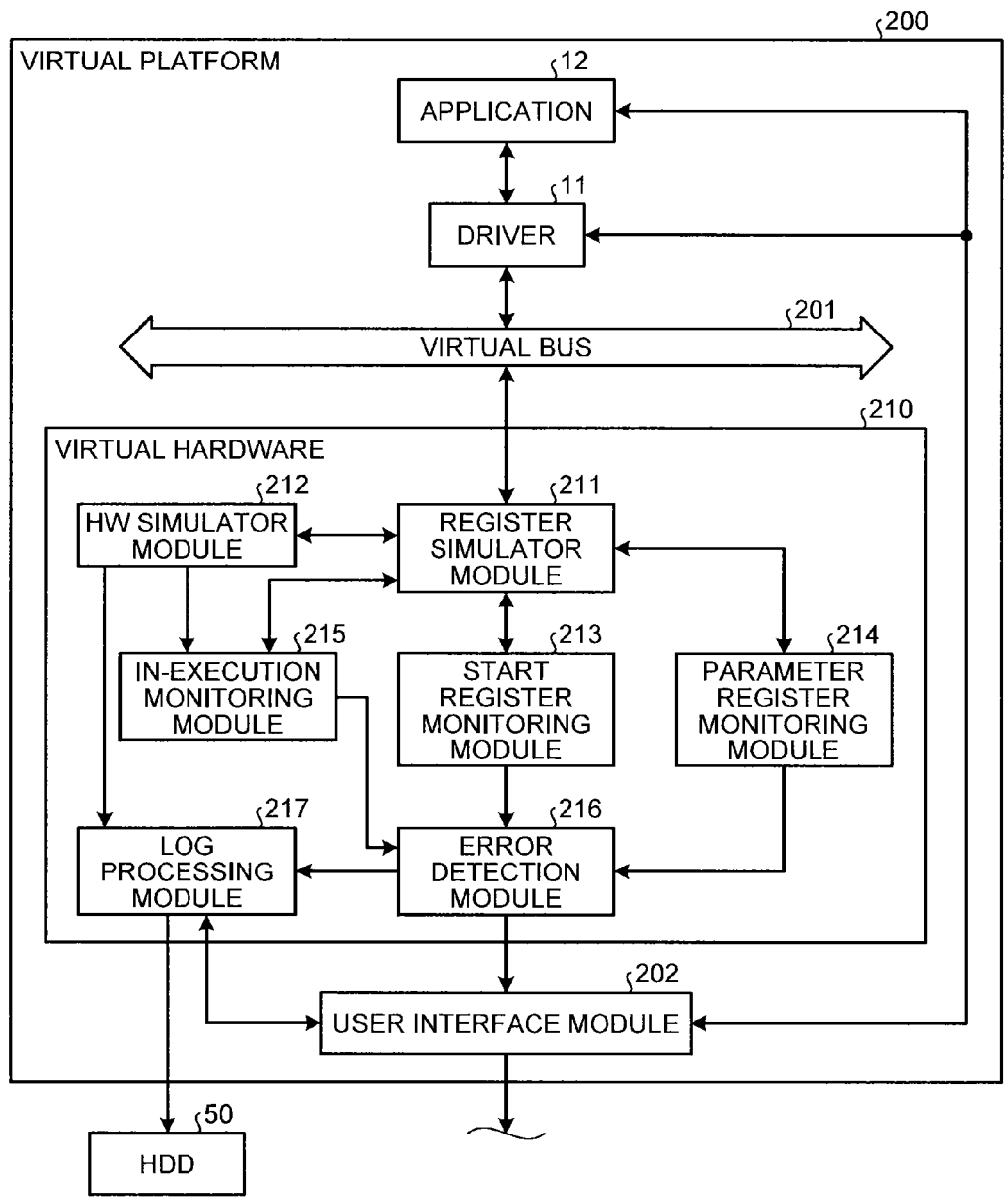

FIG.7

| APPLICATION OPERATION LOG | DRIVER OPERATION LOG | HW OPERATION LOG |
|---|---|---|
| xxxxxxxx.XXXX<br>XX<br>XXXX.xxx<br>xxxXXXXXXX<br>Xx<br>XXX (Xxxx) | XXX<br>X xxxxXXXXX<br>xxxxXXX<br>xxXXXX<br>xx (xxxx)<br>XXXXXXXXX | xxxxXXX<br>xxXXXX<br>xxxxxxxxxxxxx (XX)<br>xXxxXXX<br>xx XXXXX<br>XXXXXXXXXX |

FIG.10A

HW OPERATION LOG

| 00:12 | xxxxXXX |
|---|---|
| 00:13 | xxXXXX |
| 00:15 | xxxxxxxxxxxx (XX) |
| 00:16 | xXxxXXX |
| 00:16 | xx XXXXX |
| 00:18 | XXXXXXXXX |
| ... | |

FIG.10B

APPLICATION OPERATION LOG

| 00:07 | xxxxxxxxx.XXXX |
|---|---|
| 00:10 | XX |
| 00:12 | XXXX.xxx |
| 00:15 | xxxXXXXXX |
| 00:16 | Xx |
| 00:18 | XXX (Xxxx) |
| ... | |

FIG.10C

DRIVER OPERATION LOG

| 00:09 | XXX |
|---|---|
| 00:11 | X xxxxXXXXX |
| 00:11 | xxxxXXX |
| 00:13 | xxXXXX |
| 00:15 | xx (xxxx) |
| 00:19 | XXXXXXXX |
| ... | |

FIG.11A

APPLICATION OPERATION LOG

| 00:07 | xxxxxxxxx.XXXX |
| 00:10 | XX |
| 00:12 | XXXX.xxx |
| 00:15 | xxxXXXXXXX |
| 00:16 | "Error" |
| 00:18 | XXX (Xxxx) |
| | ... |

FIG.11B

DRIVER OPERATION LOG

| 00:09 | XXX |
| 00:11 | X xxxxXXXXX |
| 00:11 | xxxxXXX |
| 00:13 | xxXXXX |
| 00:15 | "Error" |
| 00:19 | XXXXXXXX |
| | ... |

ERROR DETECTION METHOD, INFORMATION PROCESSING CIRCUIT, AND ERROR DETECTION COMPUTER PROGRAM PRODUCT

CROSS-REFERENCE TO RELATED APPLICATIONS

The present application claims priority to and incorporates by reference the entire contents of Japanese Patent Application No. 2011-237316 filed in Japan on Oct. 28, 2011.

BACKGROUND OF THE INVENTION

1. Field of the Invention

The present invention relates to an error detection method, an information processing circuit, and an error detection computer program product, and particularly relates to error detection of software that operates in conjunction with hardware.

2. Description of the Related Art

Software that operates in conjunction with hardware controls operation of the hardware by setting a parameter in a register provided in the hardware. For example, when starting the hardware and making it execute processing, the software sets a value in a register assigned for instructing starting of the hardware and/or execution of processing.

When developing such software, it is necessary to configure a computer program so that no trouble occurs in operation of hardware to be controlled. As a unit used for creating such software, there is proposed a simulation device that performs simulation based on a verification scenario (for example, refer to Japanese Patent Application Laid-open No. 2008-226207).

A technique disclosed in Japanese Patent Application Laid-open No. 2008-226207 makes it possible to verify software and hardware with high accuracy by outputting a response to an instruction from a driver serving as software controlling hardware, and also by storing control information at that time.

A case in which a trouble occurs in operation of hardware to be controlled as mentioned above refers to a case in which, for example, the hardware starts processing based on control from the software, and thereafter, before completing the processing, receives again a start instruction of the hardware from the software, or receives a change instruction of a parameter. Such a phenomenon is a phenomenon occurring in a register inside the hardware, and therefore, an operator is difficult to recognize the phenomenon in an easy and instant manner.

Examples of hardware as described above include a circuit for image processing incorporated in an image processing apparatus, a plotter engine that performs image formation output, and a scanner engine that reads documents. To speed up control of such hardware for image processing by software, there is a case of using a configuration in which an application directly controls the hardware without intervention of a driver, that is, the application directly accesses a register of the hardware.

If hardware is controlled via a driver, an error such as described above can be detected in some cases by a register control function included in the driver. However, if an application directly controls hardware while omitting a driver, detection of an error becomes more difficult.

As a method to easily achieve prevention of change in a register value for a start register and a parameter register while hardware is in operation, there is a method of blocking change in a register value while operation is performed. However, this is a makeshift measure, and does not correct software that includes erroneous processing such as changing a register value even though hardware is in operation.

It should be noted that a situation such as described above is a problem in simulation in a development stage of hardware and in operation verification of created hardware, and can also be a problem in the same way even in hardware incorporated in an apparatus that has put into service.

There is a need to make it possible to recognize, in an easy and quick manner, a change in a register value while hardware is in operation.

SUMMARY OF THE INVENTION

It is an object of the present invention to at least partially solve the problems in the conventional technology.

An error detection method is to detect an error in a program to control hardware, which executes predetermined processing, via a register. The error detection method includes: outputting a signal indicating whether the predetermined processing is in execution; detecting that a change is made in a register value in the register, which register value is related to control of the predetermined processing, and outputting a detection signal; and detecting an error when it is detected, based on the signal indicating whether the predetermined processing is in execution and on the detection signal, that the change is made in the register value while the predetermined processing is in execution.

An information processing circuit executes predetermined processing. The information processing circuit includes: a register that accepts control from a program to control the predetermined processing; an information processing module that executes the predetermined processing; an in-execution monitoring module that monitors operation of the information processing module and outputs a signal indicating whether the predetermined processing is in execution; a register monitoring module that monitors the register and detects that a change is made in a register value related to operation of the predetermined processing, and outputs a detection signal; and an error detection module that detects an error when it is detected, based on the signal indicating whether the predetermined processing is in execution and on the detection signal, that the change is made in the register value while the predetermined processing is in execution.

An error detection computer program product includes a non-transitory computer-usable medium having computer-readable program codes of an error detection program embodied in the medium. The error detection program is to detect an error in a program to control hardware, which executes predetermined processing, via a register. The program codes when executed cause a computer to execute: simulating the predetermined processing executed by the hardware; outputting a signal indicating whether simulation of the predetermined processing is in execution; detecting that a change is made in a register value in the register, which register value is related to the predetermined processing, and outputting a detection signal; and detecting an error when it is detected, based on the signal indicating whether the simulation of the predetermined processing is in execution and on the detection signal, that the change is made in the register value while the simulation of the predetermined processing is in execution.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating a functional configuration of a virtual platform according to the embodiment of the present invention;

FIG. 7 is a diagram illustrating an example of a result display screen displayed by a user interface module 202 according to the embodiment of the present invention;

FIGS. 10A to 10C are diagrams illustrating operation logs according to the further embodiment of the present invention; and FIGS. 11A and 11B are diagrams illustrating operation logs of an application and a driver according to a still further embodiment of the present invention.

DETAILED DESCRIPTION OF THE PREFERRED EMBODIMENTS

First Embodiment

An embodiment of the present invention will be described below in detail with reference to the accompanying drawings. In the present embodiment, description will be made, as an example, of error detection of hardware incorporated in an image processing apparatus serving as a multifunction peripheral (MFP) that includes functions of a printer, a scanner, a copier, and the like.

Figure 1:
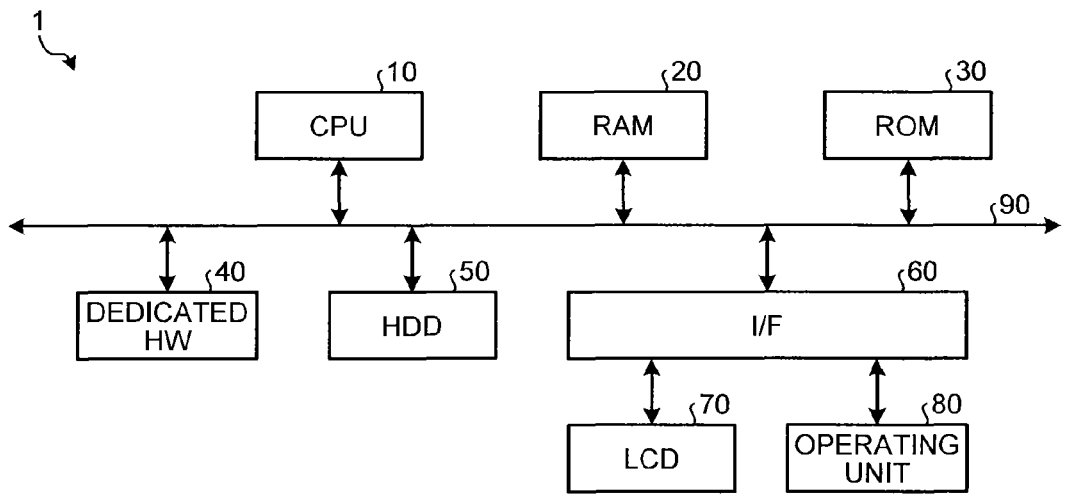
FIG. 1 is a block diagram illustrating a hardware configuration of an image forming apparatus according to an embodiment of the present invention.

FIG. 1 is a block diagram illustrating a hardware configuration of an image forming apparatus 1 according to the present embodiment. As illustrated in FIG. 1, the image forming apparatus 1 according to the present embodiment has a configuration similar to that of an information processing terminal such as a general server or a general personal computer (PC), and also has an engine related to image formation output. More specifically, in the image forming apparatus 1 according to the present embodiment, a central processing unit (CPU) 10, a random access memory (RAM) 20, a read-only memory (ROM) 30, dedicated hardware (HW) 40, a hard disk drive (HDD) 50, and an I/F 60 are connected to each other via a bus 90. In addition, a liquid crystal display (LCD) 70 and an operating unit 80 are connected to the I/F 60.

The CPU 10 is an arithmetic unit, and controls overall operation of the image forming apparatus 1. The RAM 20 is a volatile storage medium capable of high-speed reading and writing of information, and is used as a work area when the CPU 10 processes information. The ROM 30 is a read-only nonvolatile storage medium, and stores therein a computer program such as firmware.

The dedicated HW 40 is an information processing circuit that executes predetermined processing in the image forming apparatus 1. The dedicated HW 40 includes a print engine to perform image formation output, a scanner unit to read a document, and a hardware accelerator that generates image information for the print engine to perform the image formation output. Processing on registers provided in the dedicated HW 40 to accept software control is a target for which an error is intended to be detected in the present embodiment.

The HDD 50 is a nonvolatile storage medium capable of reading and writing of information, and stores therein an operating system (OS), various control programs, various application programs, and the like. The I/F 60 connects the bus 90 with various types of hardware, a network, and the like, and controls connection. The LCD 70 is a visual user interface for a user to check a state of the image forming apparatus 1. The operating unit 80 is a user interface, such as a keyboard and a mouse, for a user to enter information into the image forming apparatus 1.

In such a hardware configuration, a computer program stored in the ROM 30, the HDD 50, or a recording medium such as an optical disc (not illustrated) is read out to the RAM 20, and the CPU 10 carries out arithmetic operations according to the program, thus configuring a software control unit. A functional block implementing a function of the image forming apparatus 1 according to the present embodiment is configured by combination of the thus configured software control unit with the hardware.

Figure 2:
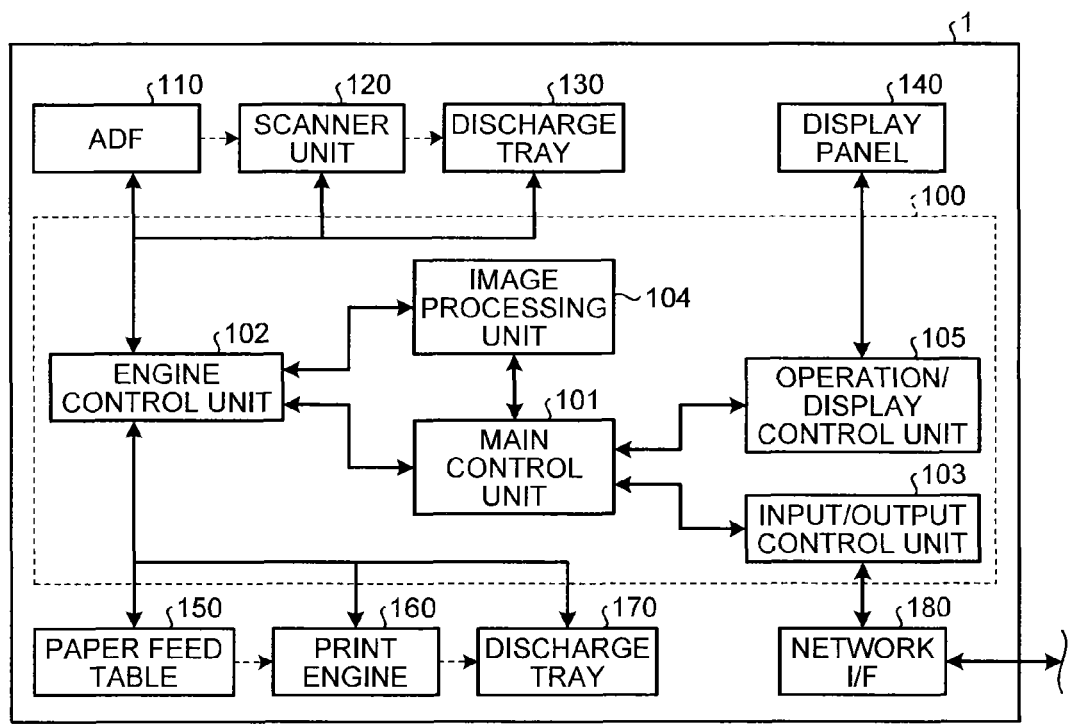
FIG. 2 is a diagram illustrating a functional configuration of the image forming apparatus according to the embodiment of the present invention.

A functional configuration of the image forming apparatus 1 according to the present embodiment will be described next with reference to FIG. 2. FIG. 2 is a block diagram illustrating a functional configuration of the image forming apparatus 1 according to the present embodiment. As illustrated in FIG. 2, the image forming apparatus 1 according to the present embodiment has a controller 100, an auto document feeder (ADF) 110, a scanner unit 120, a discharge tray 130, a display panel 140, a paper feed table 150, a print engine 160, a discharge tray 170, and a network I/F 180.

The controller 100 has a main control unit 101, an engine control unit 102, an input/output control unit 103, an image processing unit 104, and an operation/display control unit 105. As illustrated in FIG. 2, the image forming apparatus 1 according to the present embodiment is configured as an MFP having the scanner unit 120 and the print engine 160. Note that, in FIG. 2, electrical connections are indicated by arrows with solid lines, and flows of sheets are indicated by arrows with dashed lines.

The display panel 140 is an output interface that visually displays a state of the image forming apparatus 1, and is also an input interface (operating unit) serving as a touch panel used when a user directly operates the image forming apparatus 1 or enters information into the image forming apparatus 1. The network I/F 180 is an interface for the image forming apparatus 1 to communicate with other devices via the network, and an Ethernet (registered trademark) interface or a universal serial bus (USB) interface is used for the network I/F 180.

The scanner unit 120 is an image capturing apparatus to read a document while the print engine 160 is a plotter engine to perform image formation output to a sheet. Both the scanner unit 120 and the print engine 160 are implemented by the dedicated HW 40. What is detected as one of errors to be detected in the present embodiment is relating to control of a register provided in each of the scanner unit 120 and the print engine 160 to control the scanner unit 120 and the print engine 160 by the controller 100.

The controller 100 is configured by combination of software and hardware. Specifically, the controller 100 is configured by hardware such as an integrated circuit and by a software control unit configured in such a manner that control programs such as firmware stored in a nonvolatile storage media such as the ROM 30, a nonvolatile memory, the HDD 50 or an optical disc are loaded into a volatile memory (hereinafter called a memory) such as the RAM 20, and the CPU 10 carries out arithmetic operations according to the loaded control programs. The controller 100 serves as a control unit that controls the entire image forming apparatus 1.

The main control unit 101 plays a role of controlling the units included in the controller 100, and issues commands to the respective units of the controller 100. The engine control unit 102 serves as a drive unit that controls or drives the print engine 160, the scanner unit 120, and the like. The input/output control unit 103 inputs signals and commands received via the network I/F 180 into the main control unit 101. The main control unit 101 controls the input/output control unit 103, and accesses other devices via the network I/F 180.

The image processing unit 104 generates drawing information based on print information included in an input print job according to control of the main control unit 101. The drawing information is information to draw an image to be formed in image forming operation by the print engine 160 serving as an image forming unit. The print information included in a print job is information converted by a printer driver installed in an information processing apparatus such as a PC into a format recognizable by the image forming apparatus 1, and, in the present embodiment, is information described in a page description language (PDL).

The image processing unit 104 is implemented by software configured in such a manner that the CPU 10 carries out arithmetic operations according to a program, and is also implemented by a hardware accelerator such as mentioned above. In the present embodiment, what is detected as one of errors to be detected is relating to control of a register in the dedicated HW 40 serving as the image processing unit 104 in this way. The operation/display control unit 105 displays information on the display panel 140, or notifies the main control unit 101 of information input via the display panel 140.

When the image forming apparatus 1 operates as a printer, the input/output control unit 103 first receives a print job via the network I/F 180. The input/output control unit 103 transfers the received print job to the main control unit 101. Upon receiving the print job, the main control unit 101 controls the image processing unit 104 to cause it to generate drawing information based on print information included in the print job.

After the drawing information is generated by the image processing unit 104, the engine control unit 102 performs image formation, based on the generated drawing information, onto a sheet fed from the paper feed table 150. In other words, the print engine 160 serves as the image forming unit. As a specific aspect of the print engine 160, for example, an image forming mechanism using an ink-jet system or an image forming mechanism using electrophotography can be used. A document with an image formed thereon by the print engine 160 is discharged to the discharge tray 170.

When the image forming apparatus 1 operates as a scanner, the operation/display control unit 105 or the input/output control unit 103 transfers a scanning execution signal to the main control unit 101 in response to operation of the display panel 140 by a user or in response to a scanning execution instruction input via the network I/F 180 from, for example, an external information processing terminal for a client. The main control unit 101 controls the engine control unit 102 based on the received scanning execution signal.

The engine control unit 102 drives the ADF 110 to feed a document that is an image capturing target set in the ADF 110 to the scanner unit 120. The engine control unit 102 also drives the scanner unit 120 to capture an image of the document fed from the ADF 110. If a document is directly set on the scanner unit 120 instead of being set in the ADF 110, the scanner unit 120 captures an image of the thus set document according to control of the engine control unit 102. In other words, the scanner unit 120 operates as an image capturing unit.

In image capturing operation, an image pickup element such as a CCD included in the scanner unit 120 optically scan a document, and thus, image pickup information is generated based on optical information. The engine control unit 102 transfers the image pickup information generated by the scanner unit 120 to the image processing unit 104. Following control of the main control unit 101, the image processing unit 104 generates image information based on the image pickup information received from the engine control unit 102. The image information generated by the image processing unit 104 is stored in a storage medium, such as the HDD 50, installed in the image forming apparatus 1.

Depending on an instruction of a user, the image information generated by the image processing unit 104 is directly stored in the HDD 50, or the like, or sent to an external device via the input/output control unit 103 and the network I/F 180. In other words, the scanner unit 120 and the engine control unit 102 serve as an image input unit.

On the other hand, when the image forming apparatus 1 operates as a copier, the image processing unit 104 generates drawing information based on the image pickup information received by the engine control unit 102 from the scanner unit 120 or on the image information generated by the image processing unit 104. Based on the drawing information, the engine control unit 102 drives the print engine 160 in a manner similar to a case of operation as the printer.

Figure 3:
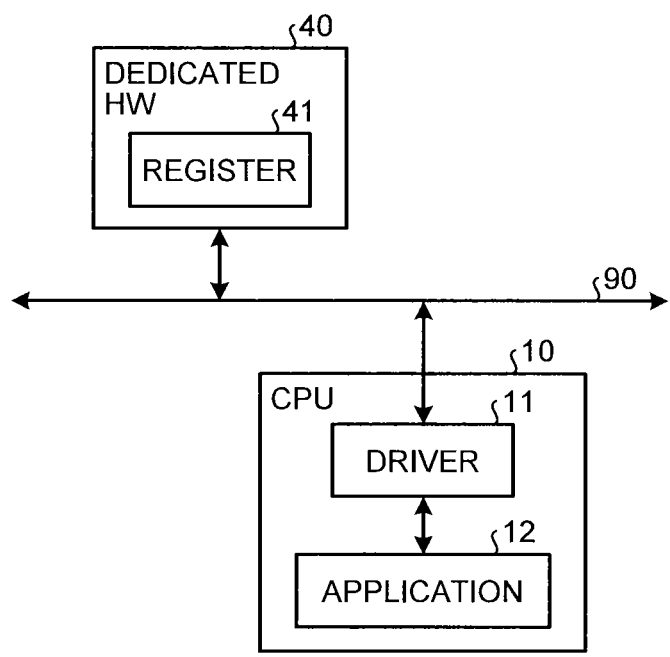
FIG. 3 is a diagram illustrating a control configuration of dedicated hardware (HW) according to the embodiment of the present invention.

Next, an aspect of control of the dedicated HW 40 according to the present embodiment will be described with reference to FIG. 3. As illustrated in FIG. 3, the dedicated HW 40 is provided therein with a register 41 to exchange information with the CPU 10. The register 41 is connected to the CPU 10 via the bus 90, and accepts a setting of a register value via the bus 90.

The CPU 10 carries out arithmetic operations according to a program loaded in the RAM 20, and thereby accesses the register of the dedicated HW 40 to control the dedicated HW 40. A program to control the dedicated HW 40 by the CPU 10 is a driver 11 or an application 12 as illustrated in FIG. 3. It should be noted that, although, in FIG. 3, the driver 11 and the application 12 are illustrated in the CPU 10 for convenience of illustration, the CPU 10 actually performs processing as the driver 11 and the application 12 by carrying out arithmetic operations according to a driver program and an application program loaded in the RAM 20 as described above.

The application 12 is software configured to execute each function of the image processing apparatus 1, and is, for example, an application to perform printout, an application to perform scanning, and an application to perform copying.

The driver 11 is software configured to control the register 41 between the application 12 and the dedicated HW 40 when the application 12 uses a function of the dedicated HW 40, and is configured for each of the scanner unit 120, the print engine 160, and the hardware accelerator.

While FIG. 3 illustrates an example in which the application 12 controls the dedicated HW 40 via the driver 11, it may be configured in such a manner that the driver 11 is omitted, and the application 12 directly accesses the register 41 of the dedicated HW 40. Furthermore, while FIG. 3 illustrates, for simplification of illustration, that the CPU 10 is connected to the bus 90, the CPU 10 is actually connected to the bus 90 via a bridge of a chipset or the like.

Figure 4A:
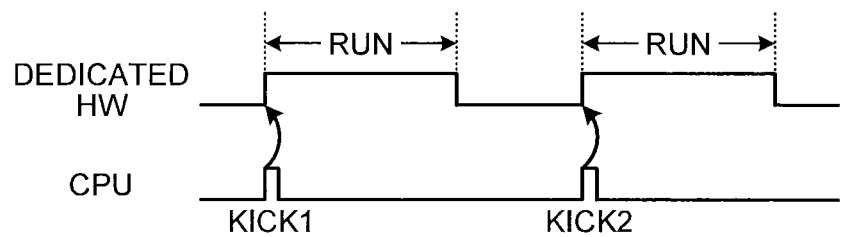
FIGS. 4A to 4C are diagrams illustrating an aspect of control of the dedicated HW according to the embodiment of the present invention.

Next, description will be made of an aspect of control of the dedicated HW 40 by the CPU 10 and an aspect of an error to be detected, with reference to FIGS. 4A to 4C. FIG. 4A is a timing chart illustrating a general operating state when the dedicated HW 40 is started and operated by control of the CPU 10. In the description given below, control by the application 12 and the driver 11 will be explained as control by the CPU 10 as illustrated in FIG. 3.

As illustrated in FIG. 4A, when causing the dedicated HW 40 to perform operation, the CPU 10 starts the dedicated HW 40 by writing a register value into a start register of the register 41. In FIGS. 4A to 4C, setting of the start register value by the CPU 10 is indicated as "KICK".

The dedicated HW 40 started by "KICK1" set by the CPU 10 starts hardware processing according to a parameter value set in a register for a parameter setting in the register 41. Thereby, the hardware processing is performed during a period indicated by "RUN" in FIG. 4A. In a similar manner, when the CPU 10 sets "KICK2", the dedicated HW 40 performs hardware processing during a predetermined processing period indicated by "RUN".

Figure 4B:
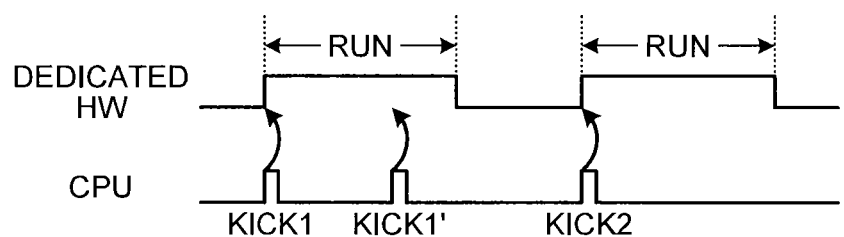

FIG. 4B is a timing chart illustrating a case in which an error among errors to be detected in the present embodiment is caused because a register value is written to the start register, that is, a KICK is performed, even though the dedicated HW 40 stays in a processing period. Even though "KICK1'" is performed by the CPU 10 before an execution period of hardware processing "RUN" by "KICK1" is terminated, hardware processing corresponding to "KICK1'" cannot be performed because hardware processing corresponding to "KICK1" is in execution. This can cause a failure in operation of the dedicated HW 40, the application 12, or the driver 11.

Figure 4C:
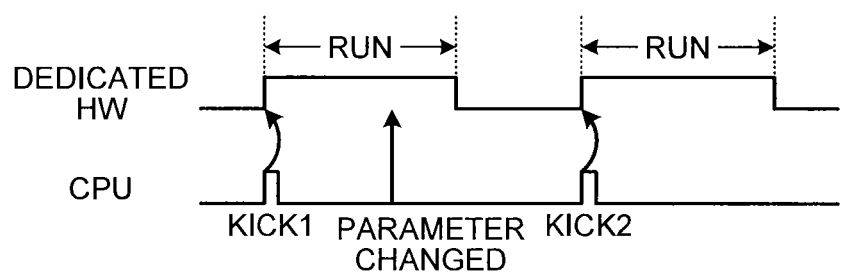

In a similar manner, FIG. 4C is a timing chart illustrating a case in which an error among errors to be detected in the present embodiment is caused because a parameter value is written to a parameter setting register, that is, a parameter is changed, even though the dedicated HW 40 stays in a processing period. When a parameter is changed by the CPU 10 before an execution period of hardware processing "RUN" by "KICK1" is terminated, even though hardware processing corresponding to "KICK1" has been started with the parameter before change, the parameter is changed while the processing is underway. Thus, this case can cause a failure in operation of the dedicated HW 40, the application 12, or the driver 11.

Such an invalid operation of "KICK1'" or parameter change occurs because a program to configure the driver 11 or the application 12 includes a computer program causing setting of the start register, change of a parameter, or the like to be performed even though the dedicated HW 40 is in operation. This is a bug included in a computer program to configure the driver 11 or the application 12.

A gist according to the present embodiment lies in detecting an access to the register 41, which is invalid for operation of the dedicated HW 40 or for operation of the application 12 or the driver 11, such as setting of the start register or change of a parameter, while the dedicated HW 40 is executing hardware operation.

To detect such an error, in the present embodiment, a virtual platform is configured to simulate an environment including the dedicated HW 40, the bus 90, the driver 11, and the application 12, on an information processing apparatus, such as a personal computer (PC), having components corresponding to components illustrated in FIG. 1 other than the dedicated HW 40. The virtual platform according to the present embodiment will be described below.

FIG. 5 is a diagram illustrating a configuration of a virtual platform 200 according to the present embodiment. The virtual platform 200 is configured in such a manner that the CPU 10 carries out arithmetic operations according to a program loaded in the RAM 20, and simulates a configuration including the dedicated HW 40, the bus 90, and the CPU 10 such as described in FIG. 3.

As illustrated in FIG. 5, the virtual platform 200 includes the driver 11, the application 12, a virtual bus 201, a user interface module 202, and virtual hardware 210. The virtual hardware 210 includes a register simulator module 211, an HW simulator module 212, a start register monitoring module 213, a parameter register monitoring module 214, an in-execution monitoring module 215, an error detection module 216, and a log processing module 217.

The driver 11 and the application 12 are the same as those illustrated in FIG. 3, and are configured in such a manner that the CPU 10 carries out arithmetic operations according to the respective programs. The virtual bus 201 is used to simulate a function of the bus 90, and simulates a function of processing of obtaining outputs of the driver 11 and performing register setting with respect to a register configured in the virtual hardware 210, and the like.

The virtual hardware 210 simulates a function of the dedicated HW 40, and has a function of detecting the errors explained in FIGS. 4A to 4C. The register simulator module 211 simulates a function of the register 41, and thus accepts a setting of a register value via the virtual bus 201. The HW simulator module 212 is an information processing module that simulates, based on settings of register values into the register simulator module 211, hardware operation, that is, predetermined processing, executed by the dedicated HW 40.

The start register monitoring module 213 monitors a register setting of the start register in the register simulator module 211, and, when a start register setting is performed, that is, when a change is made in a register value with respect to control of start of execution of a predetermined processing, outputs a detection signal. The parameter register monitoring module 214 monitors a register setting of a parameter setting register in the register simulator module 211, and, when a parameter is changed, that is, when a change is made in a register value that sets operation of a predetermined processing, outputs a detection signal.

In other words, each of the start register monitoring module 213 and the parameter register monitoring module 214 serves as a register monitoring module that detects a change, when it is made, to a register value with respect to control of a predetermined processing by the HW simulator module 212 and outputs a detection signal.

After the HW simulator module 212 starts simulating hardware operation according to a register setting to the start register in the register simulator module 211, the in-execution monitoring module 215 monitors whether current time is within a period in which the predetermined processing of the HW simulator module 212 is executed on simulation, and outputs a signal indicating whether the processing is in execution.

A method of monitoring, by the in-execution monitoring module 215, whether current time is within a period in which the HW simulator module 212 is executing hardware operation depends on specification of the HW simulator module 212. For example, if specification is such that the HW simulator module 212 writes a value indicating the end of operation to a register of the register simulator module 211 at the end of hardware operation, the in-execution monitoring module 215 can monitor whether current time is within an execution period of the hardware operation by monitoring the register value.

If, alternatively, specification is such that the HW simulator module 212 outputs a signal indicating completion of operation at the end of hardware operation, the in-execution monitoring module 215 can monitor whether current time is within an execution period of the hardware operation by detecting the signal indicating completion of operation. If, otherwise, an execution period of hardware operation is always constant, the in-execution monitoring module 215 can monitor whether current time is within an execution period of the hardware operation by counting a period from when the HW simulator module 212 has started simulating the hardware operation.

Depending on hardware to be simulated, there are a case in which the HW simulator module 212 outputs the signal indicating the end of operation execution, a case in which the HW simulator module 212 sets the register value indicating the end of operation execution into a dedicated register of the register simulator module 211, and the like. Based on these types of processing by the HW simulator 212, the in-execution monitoring module 215 monitors whether hardware operation is in execution on simulation by the HW simulator module 212, and outputs a signal indicating that the hardware operation is in execution.

The error detection module 216 detects an error based on signals output by the start register monitoring module 213, the parameter register monitoring module 214, and the in-execution monitoring module 215. Based on a signal output by the in-execution monitoring module 215, the error detection module 216 determines whether hardware operation is in execution on simulation by the HW simulator module 212, and, if a detection signal is output from the start register monitoring module 213 or the parameter register monitoring module 214 even though the hardware operation is in execution, detects an error.

Upon detecting an error, the error detection module 216 outputs an error detection signal to the log processing module 217 and the user interface module 202. The log processing module 217 obtains an operation log of the HW simulator module 212, and, when having obtained the error detection signal from the error detection module 216, generates an error log. The log processing module 217 stores the operation log obtained from the HW simulator 212 and the generated error log in the HDD 50.

In response to error detection by the error detection module 216, the user interface module 202 obtains, from the log processing module 217, the operation log of the HW simulator module 212 and operation logs of the driver 11 and the application 12 as well, and generates and outputs display information to display the operation logs and time of occurrence of each error in a manner such that each of the operation logs are associated with the time of occurrence. Thereby, operating states of various units around time of error occurrence are displayed on a display device such as the LCD 70.

Accordingly, an operator can understand at which part of processing steps of the driver 11 and the application 12 an error has occurred.

Figure 6:
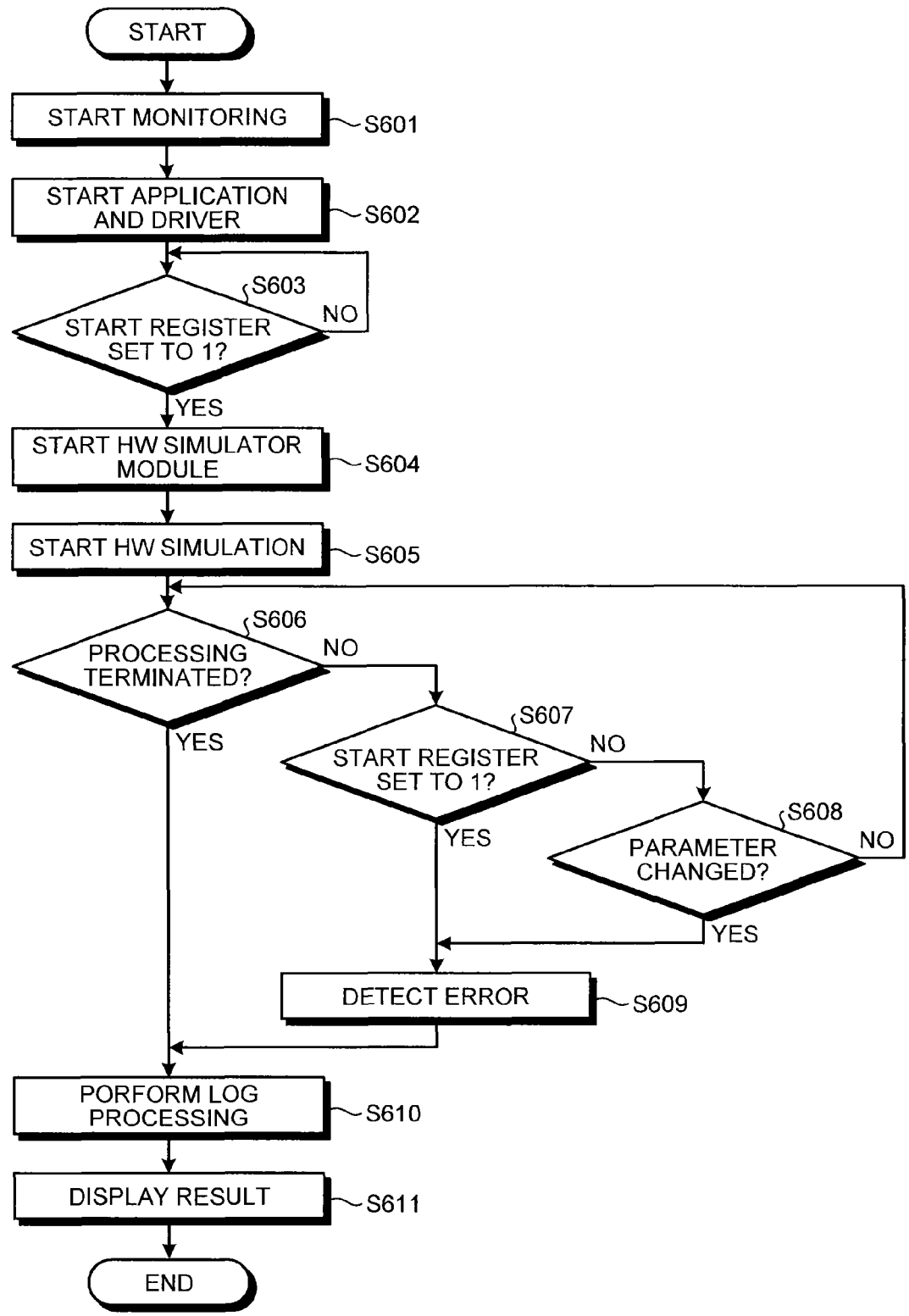
FIG. 6 is a flow chart illustrating error detection operation of the dedicated HW according to the embodiment of the present invention.

Next, operation of the virtual platform 200 according to the present embodiment will be described with reference to a flow chart in FIG. 6. As illustrated in FIG. 6, in the virtual platform 200, each of the start register monitoring module 213, the parameter register monitoring module 214, and the in-execution monitoring module 215 first starts monitoring a monitoring target thereof (S601).

Next, the driver 11 and the application 12 start (S602). If "1" is set in the start register of the register simulator module 211 due to processing of the driver 11 and the application 12 thus started (Yes at S603), the HW simulator module 212 starts (S604), and then, the HW simulator module 212 starts simulating hardware operation (S605).

If, after the HW simulator module 212 has started simulating hardware operation and before the HW simulator module 212 terminates processing of the hardware operation (No at S606), the start register monitoring module 213 detects that "1" is set in the start register of the register simulator module 211 (Yes at S607), the error detection module 216 receives signals from both the in-execution monitoring module 215 and the start register monitoring module 213. Thereby, the error detection module 216 detects an error (S609).

Otherwise, if, before the HW simulator module 212 terminates the processing of the hardware operation (No at S606), the parameter register monitoring module 214 detects a parameter change to a parameter setting register of the register simulator module 211 (No at S607 and Yes at S608), the error detection module 216 receives signals from both the in-execution monitoring module 215 and the parameter register monitoring module 214. Thereby, the error detection module 216 detects an error (S609).

Upon detecting the error, the error detection module 216 outputs an error detection signal to the log processing module 217 and the user interface module 202. In response to the error detection signal from the error detection module 216, the log processing module 217 performs log processing of obtaining an operation log of the HW simulator 212 and outputting the operation log to the user interface module 202 (S610). The operation log of the HW simulator module 212 is, for example, stored, whenever required, in an area allocated at another place in the RAM 20 than where the program configuring the virtual hardware 210 is loaded, and the log processing module 217 obtains information of the operation log.

When having detected an error, the error detection module 216 may write a value into a register for error detection provided in the register simulator module 211. By providing a break point in the application 12 and the driver 11 depending on a value of the register for error detection, operation of each of the application 12 and the driver 11 can be temporarily halted or forced to be terminated depending on error detection. Thereby, a debugging process thereafter can be performed smoothly, and it is also possible to avoid unnecessary operation logs from accumulating as a result of continuation of operation after error detection. A writing destination of a value in accordance with error detection is not limited to the register for error detection provided in the register simulator module 211, but any memory can be also implemented as the destination if the break points of the application 12 and the driver 11 support an address of the memory.

Upon obtaining an error detection signal from the error detection module 216, the user interface module 202 obtains operation logs of the application 12 and the driver 11. Then, based on operation logs of the application 12 and the driver 11 and on an operation log of the HW simulator module 212 obtained from the log processing module 217, the user interface module 202 generates display information to display error detection result and causes the display device, such as the LCD 70, to display the error detection result (S611).

Note that operation logs of the application 12 and the driver 11 may be obtained by the log processing module 217 via the register simulator module 211 instead of being obtained by the user interface module 202.

If, after starting simulation of hardware operation, the HW simulator module 212 completes the hardware operation without any error detected (Yes at S606), the log processing module 217 obtains an operation log of the HW simulator module 212 and outputs it to the user interface module 202 (S610). Upon obtaining the operation log from the log processing module 217 while receiving no error detection signal from the error detection module 216, the user interface module 202 obtains operation logs from the application 12 and the driver 11, and, after generating display information to display not error detection but normal processing result, causes the display device, such as the LCD 70, to display the detection result (S611). With such processing, operation of the virtual platform 200 according to the present embodiment is completed.

FIG. 7 illustrates an example of a display screen of error detection result displayed at S611. As illustrated in FIG. 7, the display screen of the error detection result displays "application operation log" that is an operation log of the application 12, "driver operation log" that is an operation log of the driver 11, and "HW operation log" that is an operation log of the HW simulator module 212.

As described above, when an error is detected by the error detection module 216, respective operation logs are obtained and input into the user interface module 202. Accordingly, on the display screen illustrated in FIG. 7, the respective operation logs around time of error occurrence are displayed. With such a display, a user can easily check what kind of processing in the application 12 and the driver 11 causes an error such as illustrated in FIG. 4B or 4C.

As described above, testing operation of the application 12 and the driver 11 in the virtual platform 200 according to the present embodiment makes it possible to easily detect a bug in the application 12 and the driver 11. In other words, it is possible to make it possible to recognize, in an easy and quick manner, a change in a register value while hardware is in operation.

In the above-described embodiment, description has been made of a case as an example in which a bug is detected by configuring one piece of the virtual hardware 210 for the application 12 and the driver 11 as illustrated in FIG. 5. However, an image processing apparatus in actuality is equipped with a plurality of pieces of hardware, such as the print engine, the scanner unit, and the hardware accelerator for image processing. Accordingly, a plurality of pieces of the virtual hardware 210 can be provided in order to simulate those pieces of hardware.

It is preferable to configure the application 12 and the driver 11 executed in the virtual platform 200, and the virtual bus 201, depending on a device to be simulated. For example, if a device to be simulated is configured to include a multi-core CPU, configurations of the foregoing are each realized by arithmetic operations of a multi-core CPU.

Second Embodiment

In the first embodiment, description has been made of a method, as an example, of detecting a bug by using the virtual platform 200 in a development stage of the application 12 and the driver 11. In the present embodiment, description will be made of a case as an example in which a dedicated HW 40 included in an apparatus actually put into service is provided with a function like that included in the virtual hardware 210 of FIG. 5 so that error detection in the apparatus actually put into service is made easy. Note that components given the same reference numerals as those of the first embodiment are treated as indicating the same or equivalent components, and detailed description thereof will be omitted.

Figure 8:
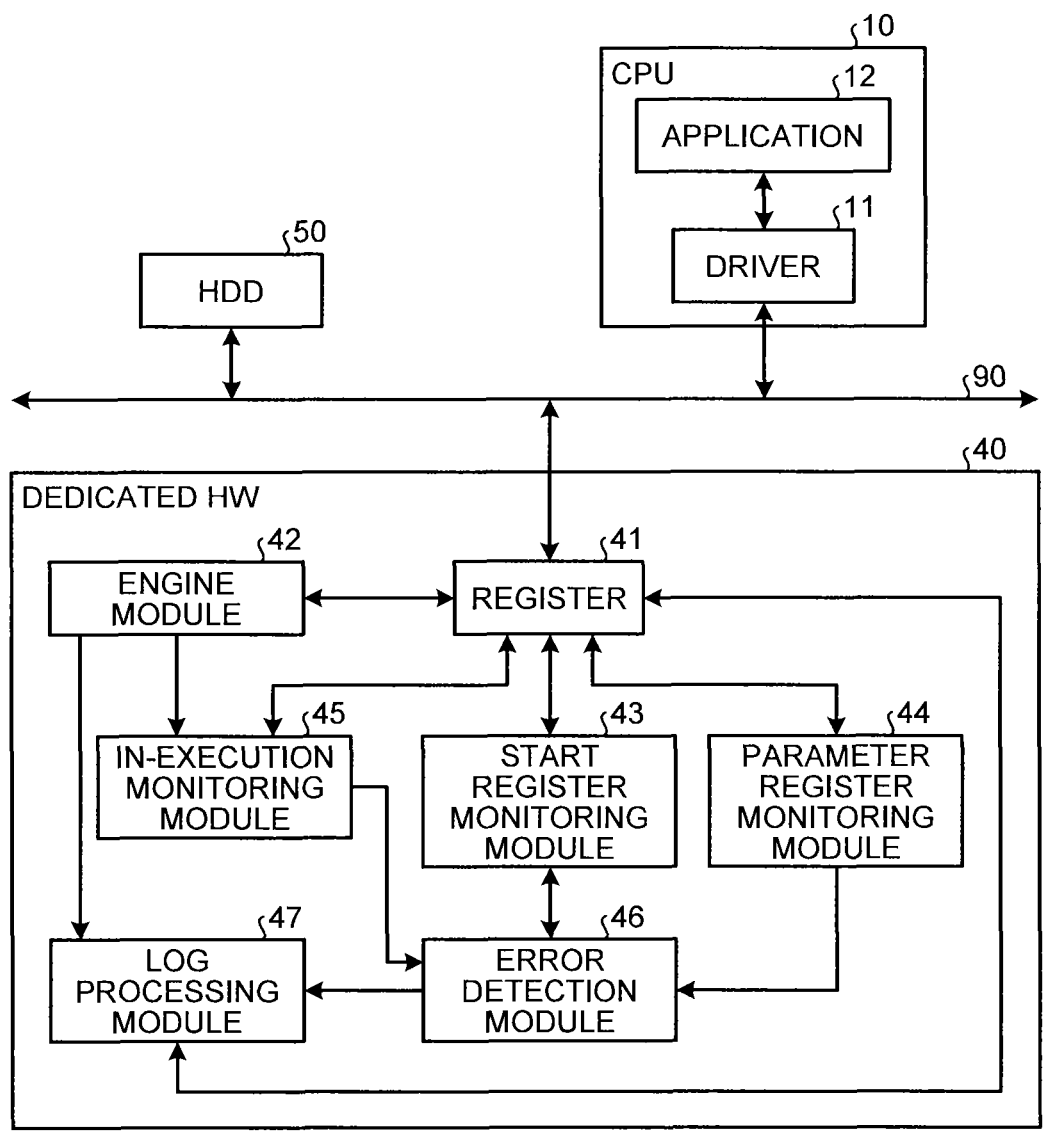
FIG. 8 is a block diagram illustrating a functional configuration of a dedicated HW according to a further embodiment of the present invention.

FIG. 8 is a diagram illustrating a connection configuration of the dedicated HW 40 according to the present embodiment with the CPU 10 and the HDD 50 via the bus 90. As illustrated in FIG. 8, the dedicated HW 40 according to the present embodiment includes a register 41, an engine module 42, a start register monitoring module 43, a parameter register monitoring module 44, an in-execution monitoring module 45, an error detection module 46, and a log processing module 47.

The register 41 is a memory area used by the dedicated HW 40 to accept control from the CPU 10. The engine module 42 is hardware to implement respective functions in the dedicated HW 40, and serves as an information processing module in a manner similar to the HW simulator module 212 of the first embodiment. For example, if the dedicated HW 40 is a hardware accelerator that performs image processing, the engine module 42 is a circuit that performs image processing.

The start register monitoring module 43, the parameter register monitoring module 44, the in-execution monitoring module 45, the error detection module 46, and the log processing module 47 are hardware modules that implement functions corresponding to the start register monitoring module 213, the parameter register monitoring module 214, the in-execution monitoring module 215, the error detection module 216, and the log processing module 217, respectively, described in FIG. 5.

Although description will be made of a case as an example in which all modules at various parts included in the dedicated HW 40 in FIG. 8 are a hardware module, the modules can also be implemented as a software module that is configured in such a manner that a microcomputer or a CPU included in the dedicated HW 40 carries out arithmetic operations according to a computer program stored in a storage medium provided in the dedicated HW 40.

Figure 9:
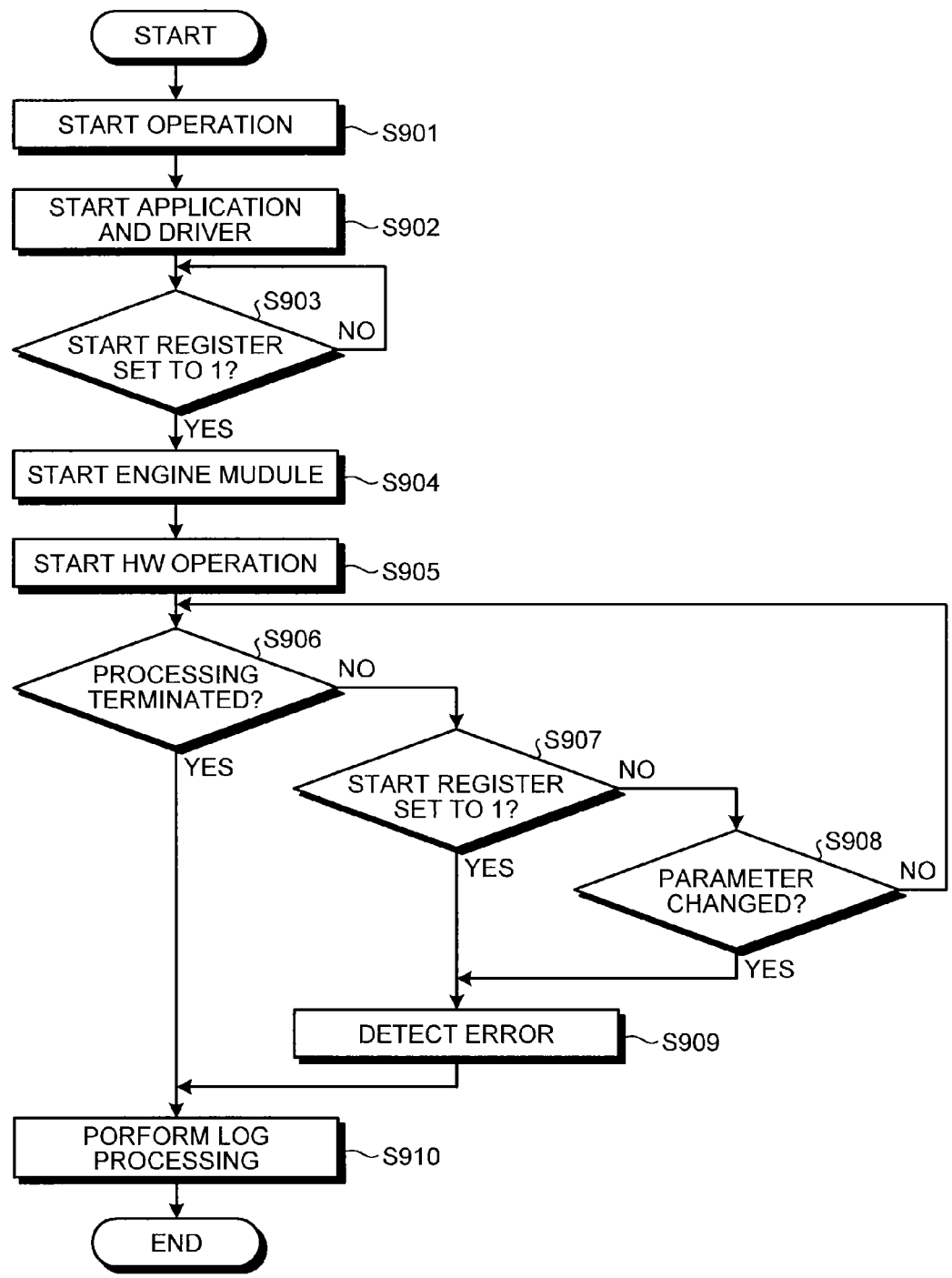
FIG. 9 is a flow chart illustrating an error detection operation of the dedicated HW according to the further embodiment of the present invention.

Next, operation of the dedicated HW 40 according to the present embodiment will be described with reference to a flow chart in FIG. 9. As illustrated in FIG. 9, after the image forming apparatus 1 starts operating (S901), the application 12 and the driver 11 start (S902). If "1" is set in a start register of the register 41 due to processing of the driver 11 and the application 12 that have started (Yes at S903), the engine module 42 starts (S904), and the engine module 42 starts hardware operation (S905).

If, after the engine module 42 has started simulating hardware operation and before the engine module 42 terminates processing of the hardware operation (No at S906), the start register monitoring module 43 detects that "1" is set in the start register of the register 41 (Yes at S907), the error detection module 46 receives signals from both the in-execution monitoring module 45 and the start register monitoring module 43. Thereby, the error detection module 46 detects an error (S909).

Further, if, before the engine module 42 terminates processing of the hardware operation (No at S906), the parameter register monitoring module 44 detects a parameter change to a parameter setting register of the register 41 (No at S907 and Yes at S908), the error detection module 46 receives signals from both the in-execution monitoring module 45 and the parameter register monitoring module 44. Thereby, the error detection module 46 detects an error (S909).

Upon detecting an error, the error detection module 46 outputs an error detection signal to the log processing module 47. In response to the error detection signal from the error detection module 46, the log processing module 47 performs log processing (S910). The log processing at S910 will be described here.

The log processing module 47 obtains an operation log of the engine module 42 and also obtains operation logs of the application 12 and the driver 11 via the register 41. In a configuration of FIG. 8, operation logs of the application 12 and the driver 11 are stored in a memory area allocated, for example, in the RAM 20, and a first address and an address range of the memory area are set in the register 41. The log processing module 47 obtains operation logs of the application 12 and the driver 11 from the RAM 20 based on an address of the memory area thus set in the register 41.

The log processing module 47 stores the operation log obtained from the engine module 42 and the operation logs obtained from the application 12 and the driver 11 into the HDD 50 via the register 41. Here, FIGS. 10A to 10C illustrate an example of operation logs according to the present embodiment. FIG. 10A illustrates an operation log obtained from the engine module 42; FIG. 10B illustrates an operation log of the application 12; and FIG. 100 illustrates an operation log of the driver 11.

As illustrated in FIGS. 10A to 100, each of the operation logs according to the present embodiment has operation log entries each associated with a time stamp. As a result, a user can easily check what kind of processing in the application 12 and the driver 11 causes an error such as illustrated in FIG. 4B or 4C, by comparing time stamps between the respective operation log entries.

In this manner, according to the present embodiment, error detection in an apparatus actually put into service can be made easy. The application 12 and the driver 11 installed in the image forming apparatus 1 may be updated after the apparatus has been put into service, and an operator bears a great burden to check for a bug in various apparatuses on an update-by-update basis. In this regard, by updating the application 12 and the driver 11 after checking for a bug to a certain degree and then performing further detailed checking while operating an apparatus, an operator can be eased from the burden of preliminary checking for a bug.

In the above-described embodiment, description has been made of a case as an example in which the log processing module 47 once obtains all operation logs, and stores the all operation logs into the HDD 50. All operation logs may instead be stored into a storage medium provided in the dedicated HW 40.

Also, instead of using a method in which the log processing module 47 obtains operation logs of the application 12 and the driver 11 and stores them into a storage medium such as the HDD 50, a method may be used in which the application 12, the driver 11, and the log processing module 47 separately store respective operation logs into a storage medium such as the HDD 50. Also, in this case, as illustrated in FIGS. 10A to 10C, because operation log entries are each associated with a time stamp, a bug can be easily checked for in a manner similar to described above.

In the first and the second embodiments, as illustrated in FIGS. 7 and 10A to 10C, description has been made of a case as an example in which operation logs of the application 12 and the driver 11 and a HW operation log are intended to be obtained. However, because it is intended to analyze what kind of processing in the application 12 and the driver 11 causes a bug, this intention can be fulfilled by determining time when an error has occurred in operation logs of the application 12 and the driver 11.

For that reason, when having detected an error, the error detection module 46 or 216 may write an error log into operation logs of the application 12 and the driver 11 via the register 41 or the register simulator module 211. As for output of the error log via the register 41 or the register simulator module 211, as described above, a memory area for the operation logs of the application 12 and the driver 11 in the RAM 20 is set in the register 41 or the register simulator module 211, and the error detection module 46 or 216 that have detected an error writes a value into the error detection register. When the value has been written into the error detection register, the application 12 and the driver 11 write the error detection log at the rearmost ends of operation logs of the application 12 and the driver 11, and thus, writing of the error log can be achieved.

FIGS. 11A and 11B illustrate examples of thus generated operation logs of the application 12 and the driver 11. Based on such an aspect of operation logs, it is possible to easily determine time when an error has occurred in operation logs of the application 12 and the driver 11.

In the first and the second embodiments, as illustrated in FIGS. 3 and 5, the description has also been made of a case as an example in which the application 12 control the dedicated HW 40 or the virtual hardware 210 via the driver 11. However, there can be a case in which an application directly controls hardware without intervention of the driver 11.

According to the present embodiment, it is possible to make it possible to recognize, in an easy and quick manner, a change in a register value while hardware is in operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An error detection method of detecting an error in a program that controls hardware, the hardware executing predetermined processing via a register, the error detection method comprising:
    outputting a signal indicating whether the predetermined processing is in execution;
    detecting that a change is made in a register value in the register, which accepts control from the program to control the predetermined processing, the register value controlling a start of execution of another process, and outputting a detection signal to start the execution of the another process, when the detecting detects that the change is made in the register value; and
    detecting, based on the signal indicating whether the predetermined processing is in execution and on the detection signal to start the execution of the another process, an error when the detecting detects that the change is made in the register value controlling the start of the execution of the another process while the predetermined processing is in execution.

2. The error detection method according to claim 1, further comprising obtaining information indicating an operation log of the program and storing the information in a storage medium.

3. The error detection method according to claim 1, further comprising:
    obtaining information indicating an operation log of the program; and generating and outputting display information to display the obtained information indicating the operation log.

4. The error detection method according to claim 3, wherein the display information generated and output when the error is detected is to display the operation log of the program and time at which the error is detected in an associated manner.

5. The error detection method according to claim 1, further comprising writing, when the error is detected, the error to an operation log of the program.

6. The error detection method according to claim 1, further comprising
displaying, side-by-side on a display device, an operation log of the program, an operation log of a driver, and an operation log of the hardware, the hardware being incorporated in a multi-function peripheral (MFP).

7. An information processing circuit executing predetermined processing, the information processing circuit comprising:
a register that accepts control from a program to control the predetermined processing;
an information processing module that executes the predetermined processing;
an in-execution monitoring module that monitors operation of the information processing module and outputs a signal indicating whether the predetermined processing is in execution;
a register monitoring module that monitors the register and detects that a change is made in a register value controlling a start of execution of another process, and outputs a detection signal to start the execution of the another process, when the register monitoring module detects that the change is made in the register value; and
an error detection module that detects, based on the signal indicating whether the predetermined processing is in execution and on the detection signal to start the execution of the another process, an error when the register monitoring module detects that the change is made in the register value controlling the start of the execution of the another process while the predetermined processing is in execution.

8. The information processing circuit according to claim 7, further comprising
a log processing module that obtains, when the error is detected, an operation log of the information processing module, which operation log is associated with a time stamp, and stores the operation log in a storage medium.

9. An error detection computer program product comprising a non-transitory computer-usable medium having computer-readable program codes of an error detection program embodied in the medium, wherein the error detection program is to detect an error in a program that controls hardware, the hardware executing predetermined processing via a register, and the program codes when executed cause a computer to execute:
simulating the predetermined processing executed by the hardware;
outputting a signal indicating whether simulation of the predetermined processing is in execution;
detecting that a change is made in a register value in the register, which accepts control from the program to control the predetermined processing, the register value controlling a start of execution of another process, and outputting a detection signal to start the execution of the another process, when the detecting detects that the change is made in the register value; and
detecting, based on the signal indicating whether the simulation of the predetermined processing is in execution and on the detection signal to start the execution of the another process, an error when the detecting that the change is made in the register value controlling the start of the execution of the another process while the simulation of the predetermined processing is in execution.

* * * * *